Jan. 18, 1938.   L. W. HAAS   2,105,648
METHOD OF STERILIZING WRAPPED BAKERY PRODUCTS
Filed Oct. 3, 1934
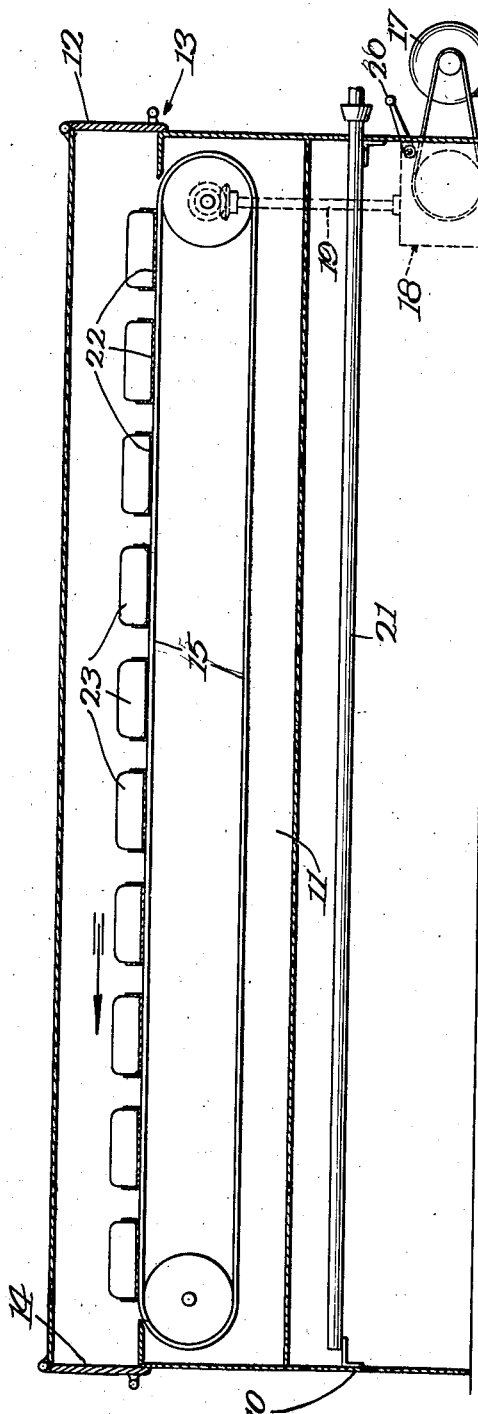
Inventor
Louis W. Haas
By Gillson, Mann & Cox Attys.

Patented Jan. 18, 1938

2,105,648

UNITED STATES PATENT OFFICE 2,105,648

METHOD OF STERILIZING WRAPPED BAKERY PRODUCTS

Louis W. Haas, Chicago, Ill., assignor to The W. E. Long Company, a corporation of Illinois Application October 3, 1934, Serial No. 746,686

2 Claims. (Cl. 99—172)

This invention relates to the treatment of bakery products to prevent the formation of mold on the product, and more particularly to the treatment of the product subsequent to the wrapping operation.

Different methods have been proposed for treating bakery products to prevent the formation of mold thereon. In certain methods, the products are treated before they are wrapped for destroying mold spores that may have lodged thereupon after the baking operation and before same have been wrapped. Other methods contemplate treating the product during the wrapping operation with an inert gas. In the former method, the product is likely to become contaminated between the time it is sterilized and before same is wrapped, or the spores adhering to the wrapping material may be enclosed with the product. In the latter method, the spores that may be lodged on either the wrapper or the product will be enclosed with those products when same are wrapped. Both methods are more or less expensive due to the fact that special machinery is required to practice the method.

The present invention seeks to remedy these difficulties by the provision of means for utilizing the conventional equipment used in bakeries for treating the product after it is wrapped for destroying mold spores and other micro-organisms contained within the wrapper.

It is common practice in canning foods in metal and glass cans to "process" the cans after the food has been inserted, but in this method the heat applied is through super-heated steam, which is usually not above 248° F., or through boiling water, and, hence, the temperature while sufficiently high to destroy the living cells is not high enough to destroy the spores, which, in some cases, require a temperature of around 284°.

The steam formed by the moisture in the can displaces the air, which, in the case of the jars, escapes around the caps which are left loose for that purpose, and, in the case of the cans, through small holes made in the tin that are afterwards sealed by a drop of solder, and, consequently, these spores do not develop unless they be of the anaerobic type, which they sometimes are.

In the applicant's method, the bakery products, as, for instance, fresh loaves of bread, after being removed from the oven and cooled, are wrapped in moisture-proof wrapping material, after which the package is subjected to heat from approximately 400° F. to 450° F. for from twelve to fifteen minutes. By extending the heating period to this length of time, the temperature is held to a point sufficiently low as not to injure the wrapper, yet high enough to insure the destruction of the spores that may have become lodged in the interstices on the surface of the product and thereby protected to a certain extent from the heat by particles of the brown crust that may surround these interstices.

The wrappers employed are of any suitable material that can withstand these temperatures without being injured. It has been found that wrappers of cellulose acetate or "Cellophane" are admirably adapted for this purpose, for, although it is seriously affected at temperatures of 500° F., it is not injuriously affected by the temperatures employed above for the times stated.

Preferably, the wrappers are so held that the sealing is accomplished during the sterilizing operation. This is considered an important feature of the invention, since it eliminates the necessity for special machinery for sealing the wrappers.

In actual practice, the loaves, after being wrapped, are replaced in the baking pans and the pans conveyed through the oven. The overlapping edges of the wrappers are held in place by contact of the loaves with the pans, whereby the wrapper is sealed during the sterilizing operation, the heating being sufficient for this purpose.

Any suitable wrapper may be employed. The wrappers known to the trade as "Cellulose M. S. T." has been found to give satisfactory results. The moisture-proofing on the wrapper apparently constitutes the sealing material.

Any suitable sealing material may be used which is capable of withstanding the heat employed without decomposing, evaporating or becoming too liquid at the temperatures employed.

Any appropriate mechanism may be employed for practicing the method. One form of the mechanism is shown on the drawing, in which:

The figure is a longitudinal vertical section of a conventional baker's oven of the traveling or endless conveyor type.

The construction is shown more or less diagrammatically, and comprises the base 10, on which is mounted the oven 11. This oven is provided with a door 12 at the loading station 13 and is also provided with an opening 14 at the opposite end for the removal of the wrapped products, as is usual in such constructions.

Within the oven is the traveling or endless conveyor 15 for supporting the bakery products, as is usual in such constructions.

The conveyor is operated by a suitable motor 17 through a change speed mechanism 18 and drive shaft 19. The speed of the conveyor 15 may be varied by manually operating the change speed mechanism by the handle 20. The oven may be heated by gas jets which are supplied with gas by the pipe 21 in the base of the oven. Since the details of the oven construction constitute no part of the present invention, it is not thought necessary to further illustrate or describe the same.

In the operation of the oven during the baking operation, the products, after being placed on pans 22, are deposited on the conveyor through the opening 12, and, after traveling through the oven are removed at the opposite end, and fresh pans inserted in the usual manner.

When the oven is employed for treating the baked products, the speed of the conveyor 15 is materially increased by adjusting the speed mechanism so that the products will be conveyed through the oven in from ten to twenty minutes, depending upon the temperature of the oven. The loaves or other products after the cooling operation are wrapped and placed in the baking pans which hold the edges of the wrappers overlapped. The pans are then deposited on the conveyor 15 which carries them through the oven. It will thus be seen that no adjustment of the heat in the oven need be made over the heat being used for baking. Adjustment of the speed of the conveyor is all that is necessary. By means of this arrangement, there is no delay in the operation of the oven for changing same— that is, from baking to sterilizing the wrapped products and vice versa.

If desired, the temperature of the oven may be lowered to around 300° for sterilizing the products, but this is not practical in a commercial plant because of the extra time required.

With a temperature around 300° F., it would require an exposure around thirty or thirty-five minutes to destroy the mold spores. Baking temperatures are preferred because they are more practical and economical from a commercial standpoint.

While the overlapping edges of the wrappers are preferably held by replacing the wrapped loaves 23 in the baking pan 22, it is understood that these edges may be held in any suitable manner during the sterilizing operation. The material used for waterproofing the cellulose wrapper becomes somewhat softened and tacky when heated, and effectively seals the wrapper as it cools, thus preventing the access of air to the loaf and protecting it from the floating spores which are usually present.

The improved method is not only highly efficient but its practice is far less expensive than any sterilizing process heretofore known.

I claim as my invention:—

1. A method of treating bakery products which comprises wrapping the product in a wrapper pervious to heat rays and having a sealing composition on its overlapping portions that will become tacky at temperatures between 400° and 450° F., holding the overlapping portions in contact while subjecting the packaged article to a temperature of approximately from 400° to 450° F. for a period of approximately from 12 to 15 minutes for destroying mold spores and the like on the surface of said product and for causing the overlapping portions of said wrapper to adhere to form a closed package.

2. A method of treating bakery products which comprises wrapping the product in a wrapper pervious to heat rays and having a sealing composition on the overlapping edges which will at a predetermined temperature become tacky but not decompose, vaporize or run, which temperature is destructive of mold spores on the surface of the product, holding the edges of the wrapper in overlapped relation and subjecting the product to said temperature for a period just sufficiently long to destroy mold spores on the surface of the product and to cause said edges to become tacky but not run whereby they will adhere to form a closed package for said product.

LOUIS W. HAAS.